United States Patent [19]
Hoffeins

[11] 4,117,343
[45] Sep. 26, 1978

[54] TURBO-MACHINE PLANT HAVING OPTIONAL OPERATING MODES

[75] Inventor: Hans Hoffeins, Viernheim, Fed. Rep. of Germany

[73] Assignee: Brown Boveri-Sulzer Turbomaschinen AG., Zurich, Switzerland

[21] Appl. No.: 750,702

[22] Filed: Dec. 15, 1976

Related U.S. Application Data

[63] Continuation of Ser. No. 515,058, Oct. 15, 1974, abandoned.

[30] Foreign Application Priority Data

Nov. 8, 1973 [DE] Fed. Rep. of Germany ....... 2355789

[51] Int. Cl.² ............................................. F02C 9/04
[52] U.S. Cl. ................................................. 290/52
[58] Field of Search .................... 290/1, 2, 40 C, 40 E, 290/52, 38 B

[56] References Cited

U.S. PATENT DOCUMENTS

| | | | |
|---|---|---|---|
| 3,677,008 | 7/1972 | Koutz | 60/650 |
| 3,733,095 | 5/1973 | Sinclair et al. | 290/52 |
| 3,813,557 | 5/1974 | Traeger | 290/2 |
| 3,831,373 | 8/1974 | Flynt | 290/52 X |
| 3,943,374 | 3/1976 | Clements | 290/52 |

FOREIGN PATENT DOCUMENTS 2,205,365 8/1972 Fed. Rep. of Germany.

*Primary Examiner*—James R. Scott
*Attorney, Agent, or Firm*—Burns, Doane, Swecker & Mathis

[57] ABSTRACT

A turbo-machine plant comprises a gas turbine connected to a synchronous electrical machine by way of an over-riding clutch and a compressor connected to the electrical machine by way of a disconnectible coupling. The machine group is operable in two different modes. In one mode, the electrical machine functions as a motor for driving the compressor which delivers air to an air storage chamber and the gas turbine is automatically disconnected from the electrical machine by the over-riding clutch. To change over to the other operational mode the power absorption of the compressor is first reduced to a low level, and the gas turbine is then brought up to synchronous speed and becomes coupled to the electrical machine which then operates for current generation.

7 Claims, 1 Drawing Figure

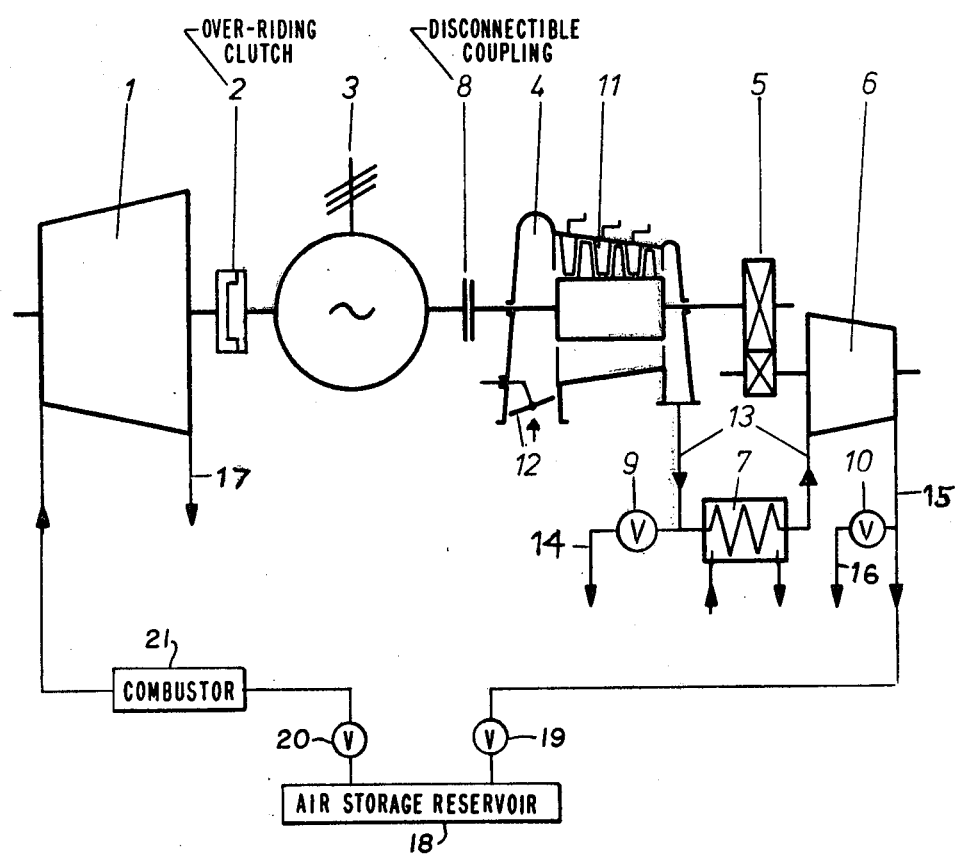

TURBO-MACHINE PLANT HAVING OPTIONAL OPERATING MODES

This application is a continuation of application Ser. No. 515,058 filed Oct. 15, 1974, now abandoned.

FIELD OF THE INVENTION

The present invention relates to improvements in a basically known turbo-machine plant comprising a gas turbine, a synchronous electrical machine operable as a motor or generator, and a compressor, the group being operable in selectively different modes by an arrangement of couplings which interconnect the gas turbine with the synchronous electrical machine and the compressor also with the synchronous electrical machine. In one mode of operation, the synchronous electrical machine operating as a motor is coupled to and drives the compressor, and the gas turbine is uncoupled. In another mode of operation, the gas turbine is coupled to and drives the synchronous electrical machine operating as a generator, and the compressor is uncoupled.

DESCRIPTION OF PRIOR ART

The dual usability of the synchronous machine, i.e. operation as a generator or motor, respectively is obviously an advantage since only one such machine including its accessories is required, and is important in all cases where the gas turbine and compressor units are to be operable alternatively, as for example in the case of air-storage gas turbine systems. On the other hand, this arrangement makes it possible also to operate the entire plant, if necessary as a gasturbo-group without accumulator, if the capacity of the compressor unit has a magnitude equal to the gas turbine throughput.

A change-over of the plant from one mode of operation to the other requires a certain time, depending upon the design of the disconnectible couplings. Even if the two couplings are constructed in the form of over-riding clutches, the compressor unit can be uncoupled from the synchronous electrical machine only at a reduced torque, or at a reduced speed. Therefore, a certain period of time will always be needed to make the change-over, especially when changing over from compressor operation to gas turbine operation, a fact which is particularly detrimental when sudden and unexpected electrical energy is required at the same time the compressor is operating.

SUMMARY OF THE INVENTION

The objective of the present invention is to overcome this disadvantage and resides in the novel concept of leaving the compressor unit coupled to the synchronous electrical machine when it is desired to generate electrical energy by coupling the gas turbine to the synchronous electrical machine but simultaneously reducing the energy requirement of the compressor unit by means of blow-off valves on the output side of the compressor and/or the use of suction-regulating valves at the intake side and/or the use of adjustable guide blading and/or adjustable rotor blading within the compressor.

BRIEF DESCRIPTION OF THE DRAWING

A preferred embodiment of the invention will now be described and is illustrated in the accompanying drawing, the single view of which is a schematic representation of the turbomachine plant and wherein the compressor unit is provided with an adjustable intake valve, adjustable guide blading and blade-off valves in the compressor output.

DESCRIPTION OF PREFERRED EMBODIMENT

With reference now to the drawings, a gas turbine 1 is seen to be coupled to a three-phase synchronous electrical machine 3 operable as a motor or generator, by means of an automatic coupling in the form of an over-riding clutch 2 which is effective when the gas turbine over-runs the synchronous electrical machine. The compressor unit is of the axial flow type and comprises a multi-stage low-pressure section 4 and a multi-stage high-pressure section 6 which are interconnected by means of a gear transmission 5. A heat exchanger 7 which serves as an intercooler is incorporated in the pipeline 13 interconnecting the output side of the low-pressure section 4 and the intake side of the high-pressure section 6 for the purpose of cooling down the gaseous medium as it passes from one section to the other, and blow-off valves 9 and 10 are associated respectively with the output sides of the low and high-pressure sections 4 and 6. Valve 9 permits air to be blown off to atmosphere from the output line of the low-pressure compressor section 4 through a blow-off line 14, and valve 10 permits air to be blown off to atmosphere from the output line 15 of the high-pressure compressor section 6b through another blow-off line 16. The outlet side of the turbine is connected to an exhaust line 17. As is conventional in turbo-machine plants of this type having optional operating modes, an air storage reservoir 18 with control valves 19, 20 and a combustor 21 are incorporated in the connections between the output line 15 of compressor 6 and the input side to turbine 1, the control valve 19 being open and control valve 20 being closed when the gas turbine 1 is uncoupled from the synchronous electrical machine 3 and the output from compressor 6 charges up the storage reservoir 18. Conversely, in the other operating mode of the plant, when the gas turbine 1 is coupled to the electrical machine 3 driving it to deliver electrical power, control valve 19 is closed and control valve 20 is opened, and the compressed air stored in reservoir 18 is supplied to the combustor 21 and the output from the latter is fed to the gas turbine inlet. The disconnectible coupling between the synchronous electrical machine 3 and the low-pressure section 4 of the compressor group is indicated at 8. However, since coupling 8 should normally remain open when the synchronous electrical machine 3 is being driven by the gas turbine 1, a simple over-riding clutch cannot be utilized and additional devices are necessary. These devices require that upon release of the coupling 8, the driving torque and hence the speed of the compressor group 4,6 be reduced.

If, during compressor operation there is a sudden demand for the production of electrical energy, i.e. conversion to gas turbine operation, it would first be necessary to disconnect the synchronous electrical machine from the network, and to lower the speed of the compressor group substantially. This would consume some time, even if braking were to be applied to the compressor unit to slow it down. Only after release of coupling 8 could the gas turbine 1 be speeded up to up-speed the synchronous electrical machine 3 and the latter be re-synchronized and placed under load. However, in accordance with the present invention, it is possible to immediately start up the gas turbine in order to furnish driving power to the synchronous electrical machine for delivery of electrical energy by the latter even while the compressor group 4,6 is operating, and to connect it automatically by way of coupling 2 with the synchronous electrical machine when the proper speed is attained. There is no need for another synchronization. The blow-off valves 9 and 10 are opened so that the load, i.e. the energy requirement of the compressor group 4,6 will not be too great. This step causes primarily a reduction in the load of the high-pressure section 6 since its blow-off operation will take place at a lower entry pressure and therefore at reduced quantitative throughput. The energy requirement of the compressor group can be further reduced by the use of adjustable guide vanes 11 in the low-pressure section 4 and/or by an intake regulating valve 12 at this same section. Thus, the blow-off valves 9 and 10, the adjustable guide vanes 11 and the intake regulating valve 12 constitute alternative means located in the flow path of the air passing through the compressor group for reducing its power absorption.

Even though the compressor group 4,6 requires, in spite of these load reducing measures, from 10 to 20% of the output power delivered by the gas turbine 1, the rapid availability of electrical energy to be delivered by the synchronous electrical machine 3, in case of a sudden need therefor will often be of much greater importance than an output in full, an output which (by use of the previously known operating techniques) can be realized only after a substantially longer period of time.

By departing from the known arrangement in effecting a change-over from charge (compressor operation) to current generation (gas turbine operation) by disconnection of the compressor from the group to the present inventive concept of keeping the compressor in operation but reducing its energy requirement i.e., its power absorption either by a reduction in intake or blow-off at the compressor, the change-over can be effected in a much shorter time and thus the emergency for additional electrical power can be satisfied with a much shorter delay. Also, in the case of the improvement provided by the invention, it becomes possible to design the coupling 8 in a more simple manner, e.g. as a simple shiftable coupling in the form of a geared coupling which can be engaged and disengaged, and which is less expensive than a coupling of the over-riding type.

The change back from gas turbine to normal compressor operation when the emergency electrical power requirement has been satisfied will require a longer period of time but such delay will generally not involve any disadvantage.

I claim:

1. In the method for rapidly changing over from a first to a second operational mode of a gas turbine plant which includes a synchronous electrical machine that can be operated optionally either as a motor or generator, and a compressor and a gas turbine connectible to said electrical machine, wherein during said first operational mode serving for the compression of air the electrical machine operating as a motor is connected to and drives the compressor while the gas turbine remains out of operation, and wherein during said second operational mode serving for generation of electrical power the electrical machine operating as a generator is connected to and is driven by the gas turbine while the compressor remains out of operation, the improvement wherein the changeover from the first to the second operational mode includes the steps of converting the compressor to operation at a low power absorption level from the electrical machine which remains operational as a motor, and then connecting the gas turbine to the electrical machine when the turbine reaches synchronous speed.

2. The method as defined in claim 1 wherein the compressor is converted to operation at a low power absorption level by throttling down the volume of air at the intake side of the compressor.

3. The method as defined in claim 1 wherein the compressor is converted to operation at a low power absorption level by discharging air from the outlet side to atmosphere through a blow-off valve.

4. The method as defined in claim 1 wherein the compressor is converted to operation at a low power absorption level by adjusting the blading to effect a low rate of air flow therethrough.

5. The method as defined in claim 1 wherein the compressor is converted to operation at a low power absorption level by adjusting the guide blading to effect a low rate of air flow therethrough.

6. The method as defined in claim 1 wherein the compressor includes high- and low-pressure stages and is converted to operation at a low power absorption level by discharging air to atmosphere through a blow-off valve located in the connection between said stages.

7. The method as defined in claim 1 wherein the compressor includes high- and low-pressure stages and is converted to operation at a low power absorption level by discharging air to atmosphere through a blow-off valve located in the connection between said stages and also through a blow-off valve located at the discharge side of said high-pressure stage.

* * * * *